(12) United States Patent
Bernardini

(10) Patent No.: US 6,336,646 B1
(45) Date of Patent: Jan. 8, 2002

(54) HUMAN POWERED VEHICLE WITH AT LEAST TWO WHEELS

(76) Inventor: Giuseppe Bernardini, Via di Bravetta 184, 00164 Rome (IT)

(*) Notice: Subject to any disclaimer, the term of this patent is extended or adjusted under 35 U.S.C. 154(b) by 0 days.

(21) Appl. No.: 09/485,905
(22) PCT Filed: Jun. 22, 1999
(86) PCT No.: PCT/IT99/00180
§ 371 Date: Apr. 24, 2000
§ 102(e) Date: Apr. 24, 2000
(87) PCT Pub. No.: WO99/67124
PCT Pub. Date: Dec. 29, 1999

(30) Foreign Application Priority Data
Jun. 22, 1998 (IT) .......................................... RM98A0415

(51) Int. Cl.[7] .............................................. B62M 1/04
(52) U.S. Cl. ....................................... 280/252; 280/256
(58) Field of Search ................................. 280/252, 253, 280/254, 255, 256, 257, 258

(56) References Cited

U.S. PATENT DOCUMENTS

| | | | |
|---|---|---|---|
| 465,140 A | * | 12/1891 | McCammon |
| 2,184,244 A | * | 12/1939 | Meyer |
| 4,717,164 A | * | 1/1988 | Levavi |
| 5,242,181 A | * | 9/1993 | Fales et al. |
| 5,263,732 A | * | 11/1993 | Harmeyer |
| 5,272,928 A | * | 12/1993 | Douglas |
| 5,290,054 A | * | 3/1994 | Po |

FOREIGN PATENT DOCUMENTS

EP 765 799 * 4/1997

* cited by examiner

*Primary Examiner*—Kevin Hurley
(74) *Attorney, Agent, or Firm*—Browdy and Neimark

(57) ABSTRACT

A human propulsion vehicle with at least two wheels (3, 5) comprising a first frame (1), handlebars (4) rotatably mounted onto the first frame (1) and connected to at least one wheel (3), a second frame (8) integrally connected to the first frame (1) at the front portion thereof and above said handlebars (4), and a seat (6) and a seat back (7) for the person is provided, the vehicle being characterized in that it further comprises a pair of cranks (10) for driving the propulsion energy with a swinging reciprocating motion around an axis of rotation (100), and a crown (9) connected thereto apted to convert the swinging reciprocating motion of the cranks (10) in a one-way rotary motion around said axis of rotation (100) and the seat back (7) being apt to provide a thrust reaction member for the person when forcing on the cranks (10).

6 Claims, 2 Drawing Sheets

HUMAN POWERED VEHICLE WITH AT LEAST TWO WHEELS

CROSS REFERENCE TO RELATED APPLICATION

The present application is the national stage under 35 U.S.C. 371 of PCT/IT99/00189, filed Jun. 22, 1999.

DESCRIPTION

The present invention relates to a human propulsion vehicle with at least two wheels, as a bicycle, tricycle or the like.

Human propulsion vehicles as bicycles or the like are already known in the art, characterised in that they comprise a pedal drive system in which the energy from the legs is converted from a reciprocating into a circular motion by a so-called wheel and crank system.

Such wheel and crank system has a drawback in that, due to constructive and functional reasons, the crank is of a moderate size, i.e. during the reciprocating motion it has a reduced length equalling the leg swing. This entails a small torque value that can be driven to the wheel or crown.

Moreover, there is a further drawback due to the fact that the person assumes a posture that is such as to be able to exert on the pedals a force not greater than the weight thereof, thus entailing a reduced value of the torque to drive the wheel or crown.

Therefore, object of the present invention is that of solving the drawbacks of the state of the art by providing a human propulsion vehicle with at least two wheels having a crank-wheel drive system suitable for converting the driving torque into higher values, so as to ensure higher values for the driving torque and reduced stress for the person with respect to the state of the art.

Another object of the present invention is to provide a human propulsion vehicle with at least two wheels whith a high efficiency crank-wheel driving system, of easy realisation, sturdy and, last but not least, of low cost.

Therefore, the present invention provides a human propulsion vehicle with at least two wheels comprising a first frame, an handlebars rotatably mounted onto the first frame and connected with at least one wheel, a second frame integrally connected to the first frame at the front portion thereof and above to said handlebars, and resting means for the person, the vehicle being characterised in that it further comprises first driving means suitable for realizing a swinging reciprocating motion around an axis of rotation and second driving means apted to convert the swinging reciprocating motion of said first driving means in a rotary motion around said axis of rotation, said first means and said second means being rotatably mounted onto said second frame.

A detailed description of a preferred embodiment of the present invention will be disclosed hereinafter, given, by way of example and not for limitative purposes, making reference to the annexed drawings, wherein.

Figure 1:
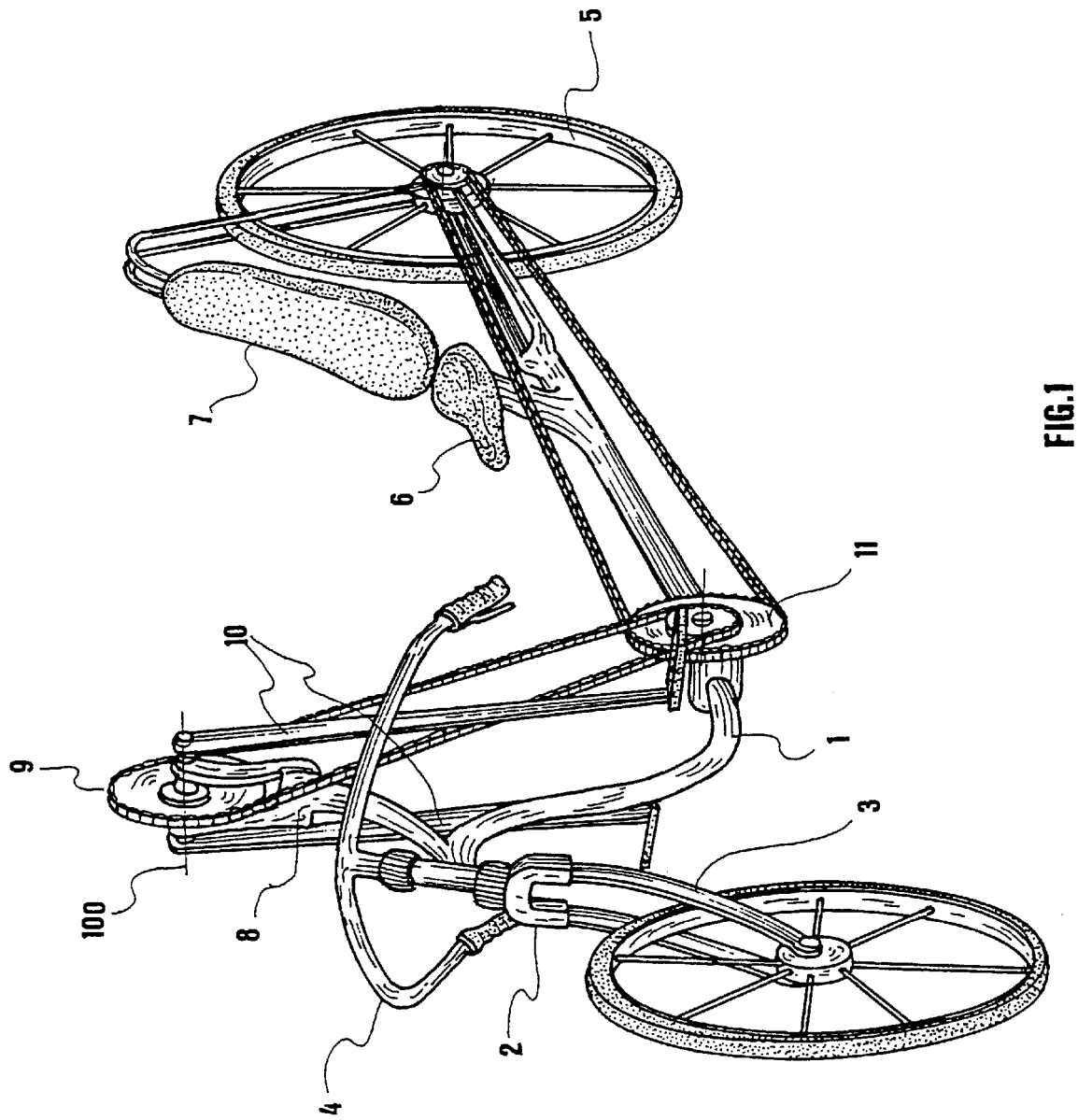
FIG. 1 is a perspective view of the vehicle of the present invention.
Figure 2:
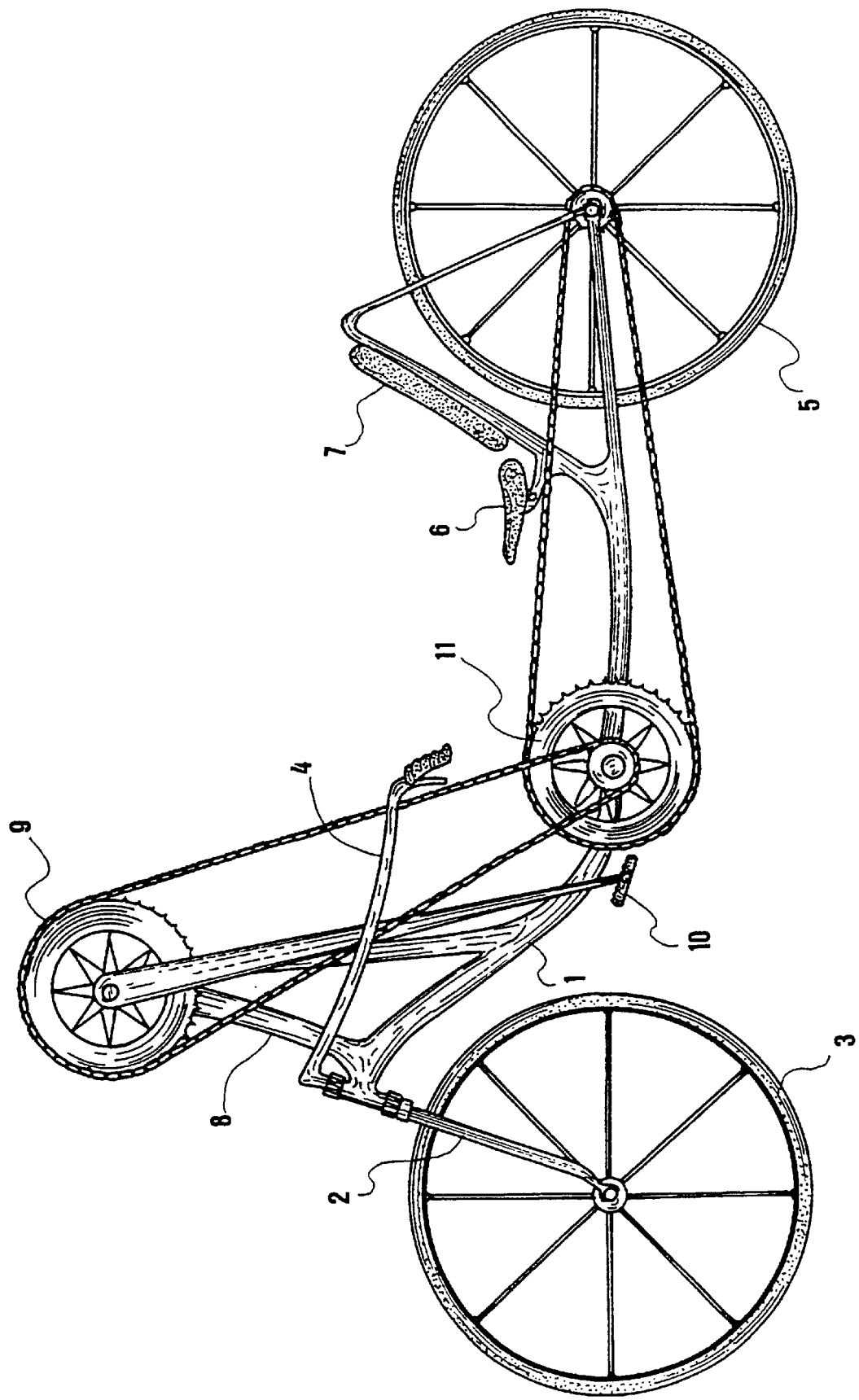
FIG. 2 is an elevational side view of the vehicle of the present invention.

With reference now to FIGS. 1 and 2, the vehicle of the present invention comprises a frame 1 to which a front fork 2 is hinged, the latter is rotatably connected to a front wheel 3 and connected at the upper end thereof to an handlebars 4 in the already known manner. Likewise, a rear wheel 5 is rotatably connected to the frame 1 in the already known manner is provided.

At the central backward portion of the frame 1 a seat 6 for the resting of the person on the frame 1 is provided. Moreover, a seat back 7 for the resting of the back region of the person is provided.

At the front region of the frame 1, in an upper position and above the handlebars 4, a second frame 8 is provided integrally connected to the first frame 1. The second frame 8 has, at the upper end thereof, a crown 9 rotatably mounted onto the frame 8. The crown 9 is in turn coaxially connected with a pair of cranks 10, one on each side of the crown 9. It is to be noted that the cranks 10 are remarkably longer than those of the state of the are.

The connection of the cranks 10 with the crown 9 is of the freewheel or sprocket wheel type, so as to make the cranks 10 capable of performing a swinging reciprocating motion around the axis of rotation (100) of the crown 9, and driving the torque to the crown 9 only in a direction of rotation thereof, and being freely rotatable in the opposite direction of rotation.

On the other hand, the crown 9 is connected with a chain or the like to a second crown 11 rotatably and centrally mounted onto the frame 1 at the lower part therof. The crown 11 is in turn connected to the hub of the wheel 5 with a chain or the like in the already known manner.

In the connection between crown 9 and crown 11, a torque conversion by a suitable reduction gear can be provided.

A first advantage of the invention is that the combination of the members of the invention is such that to drive the rear wheel 5 with a driving torque that is markedly higher than the state of the art, thus remarkably decreasing the stress of the person at same driving energy. In fact, at the same stress of the person, a torque which is remarkably higher than that of the state of the art is applied to the crown 9 by choosing a suitably length of the cranks 10.

Another advantage of the present invention derives from the fact that the person, once seated, can exert on the cranks 10 a thrust with his legs that is higher than the weight thereof, due to fact that the person when resting the back region thereof onto the seat back 7, the latter provides a reaction member to the leg thrust.

A further advantage of the present invention derives from the fact that, when seated, the person has a lesser wind resistance than that of the similar vehicles of the state of the art.

To the persons skilled in the art it will be apparent that the present invention is susceptible of several further modifications and embodiments without departing from the spirit of the invention and from the scope on the annexed claims.

What is claimed is:

1. A human propulsion vehicle with at least two wheels (3,5) comprising a first frame (1), handlebars (4) rotatably mounted onto the first frame (1) and connected with at least one wheel (3), a second frame (8) integrally connected to the first frame (1) at the front portion thereof and above to said handlebars (4), and resting means (6,7) for the person, the vehicle being characterised in that it further comprises first driving means (10) suitable for realizing a swinging reciprocating motion around an axis of rotation (100) and second driving means (9) adapted to convert the swinging reciprocating motion of said first driving means (10) in a rotary motion around said axis of rotation (100), said first means (10) and said second means (9) being rotatably mounted onto said second frame (8).

2. The human propulsion vehicle with at least two wheels (3,5) according to claim 1, characterised in that it further comprises third driving means (11) for converting and driving the torque driven from said first driving means (10) to at least one rear wheel (5) of said at least two wheels (3,5).

3. The human propulsion vehicle with at least two wheels (3,5) according to claim 1, wherein said first driving means comprises two cranks (10) connected one facing the other and positioned above said handlebars (4).

4. The human propulsion vehicle with at least two wheels (3,5) according to claim 1, wherein said second driving means comprises a crown (9) rotatably mounted onto said second frame (8) and rotatably connected to said two cranks (10) by means of a freewheel or sprocket device, the arrangement being suitable for converting the swinging motion of the cranks (10) into a one direction rotatory motion of the crown (9) and consequently driving the energy to one wheel (5) of said at least two wheels (3,5) of the vehicle by chain means.

5. The human propulsion vehicle with at least two wheels (3,5) according to claim 1, wherein said third driving means comprises a second crown (11) rotatably mounted at the lower portion of said first frame (1) and connected to said first crown (9) and to said at least one rear wheel (5) of said at least two wheels (3,5) of the vehicle.

6. The human propulsion vehicle with at least two wheels (3,5) according to claim 1, wherein said resting means comprise a seat (6) mounted in a central and lower position onto said first frame (1), and a seat back (7) placed in a backward position onto said first frame (1), the arrangement being such as to make said seat back (7) suitable for providing a thrust reaction member for the person seated therein, and suitable to give the person lesser wind resistance.

\* \* \* \* \*